March 20, 1956  G. C. PAXTON  2,738,506
BOX END LIFTING MEANS FOR NAILING MACHINES
Filed July 12, 1955  3 Sheets-Sheet 1

INVENTOR
Gerald C. Paxton
BY
ATTORNEYS

March 20, 1956  G. C. PAXTON  2,738,506
BOX END LIFTING MEANS FOR NAILING MACHINES
Filed July 12, 1955  3 Sheets-Sheet 2

INVENTOR
Gerald C. Paxton
BY
ATTORNEYS

March 20, 1956   G. C. PAXTON   2,738,506
BOX END LIFTING MEANS FOR NAILING MACHINES
Filed July 12, 1955   3 Sheets-Sheet 3
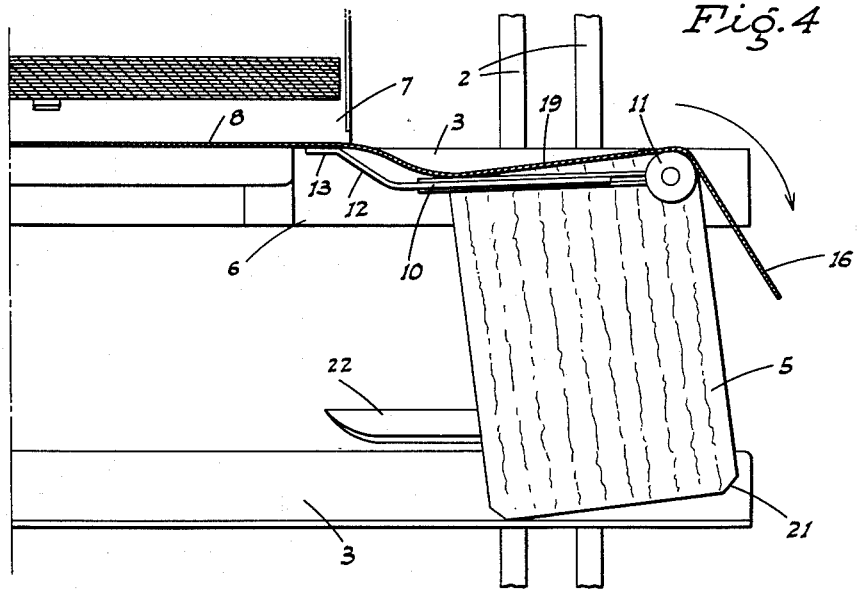
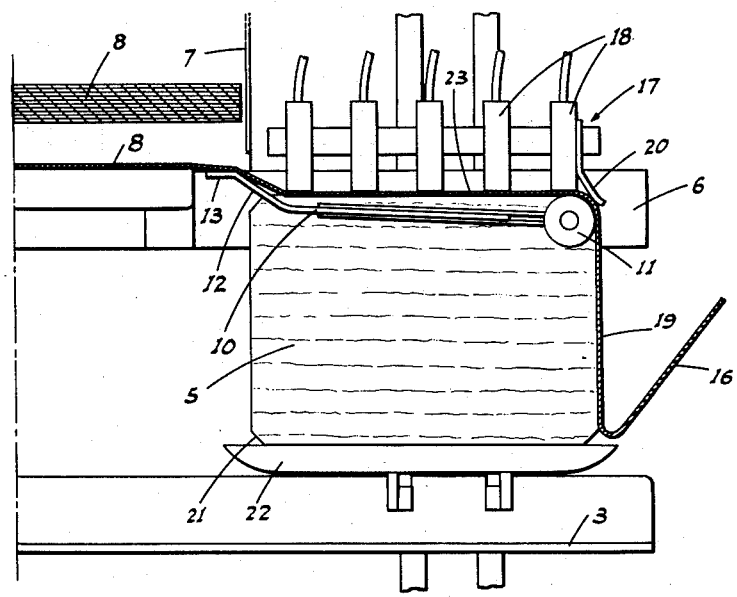
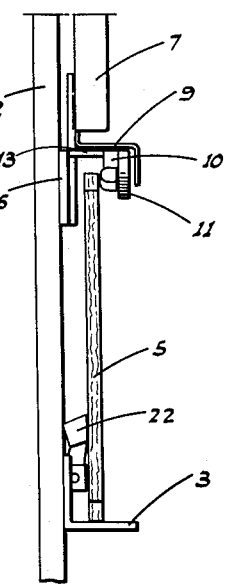
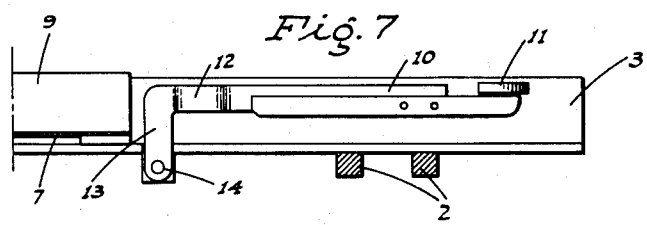
INVENTOR
Gerald C. Paxton
ATTORNEYS

United States Patent Office 2,738,506
Patented Mar. 20, 1956

2,738,506

BOX END LIFTING MEANS FOR NAILING MACHINES

Gerald C. Paxton, Sanger, Calif., assignor to General Nailing Machine Corporation, Sanger, Calif., a corporation of California Application July 12, 1955, Serial No. 521,608

13 Claims. (Cl. 1—10)

This invention relates in general to box-part assembling and nailing machines.

In particular the invention is directed to an improvement in a nailing machine adapted for use in connection with the making of boxes of the type which comprise rigid ends of rectangular form, and an initially separate, one-piece sheet of relatively stiff material—such as laminated kraft paper and wood veneer—which extends about and is secured to the box ends in wrap-around relation to form the sides, bottom, and top flaps of the box.

In nailing the relatively stiff, wrap-around sheet to the box ends in a nailing machine, said ends are first fed onto anvils in transversely spaced relation and in a predetermined position relative to the initially raised nailing units of the machine. The wrap-around sheet is then pulled forwardly by the operator into the proper initial position relative to the box ends and spans therebetween, and thereafter the nailing units are actuated to nail the sheet to those edges of the box ends which are exposed to said nailing units.

When this is accomplished, it is necessary to turn the box ends to present other edges thereof to the nailing units; the wrap-around sheet being correspondingly advanced with such turning of said box ends.

Due to the confinement of the box ends in the nailing machine during the nailing operation, it is an awkward task to manually effect such turning of the box ends, and it is therefore the major object of the present invention to provide the nailing machine with novel, automatically functioning means which will lift the box ends and the attached wrap-around sheet relative to the supporting anvils after each nailing operation, and will hold such ends lifted for ready manual turning—in the machine—from one nailing position to the next position. At the same time there is no interference with the action of the nailing units, or the firm support of the box ends on the anvils when said units are in operation.

Another object of the invention is to provide automatically functioning lift means, as in the preceding paragraph, which includes downwardly yieldable but upwardly spring-urged elements, preferably in the form of rollers, positioned to engage the under side of the wrap-around sheet at a point adjacent the upper, forward corner of the box ends so that after each nailing operation and the upward or return stroke of the nailing units, said box ends are immediately lifted at such point for the intended purpose.

A further object of the present invention is to provide automatic lifting means, as above, which can be readily and conveniently adapted to an existing type of box-part assembling and nailing machine; the lifting means being designed for ease and economy of installation.

It is also an object of the invention to provide a practical, reliable, and durable box end lifting means for nailing machines, and one which will be exceedingly effective for the purpose for which it is designed.

These objects are accomplished by means of such structure and relative arrangement of parts as will fully appear by a perusual of the following specification and claims.

In the drawings:

Fig. 4 is also a similar view, but is taken after retraction of said related nailing unit subsequent to such initial nailing operation, and shows the lifting of the partly formed box for ready manual turning thereof to the next position.

Fig. 5 is likewise a similar view, but shows the partly formed box after being turned, and as undergoing the next nailing operation.

Fig. 6 is a fragmentary front end view showing one of the lifting units in its normal relation to the adjacent anvil supported box end.

Fig. 7 is a fragmentary plan view showing one of the lifting units and its mounting in connection with the supporting structure of the box part assembling and nailing machine.

Fig. 8 is a perspective view of a box of the particular type made in the machine.

Figure 1:
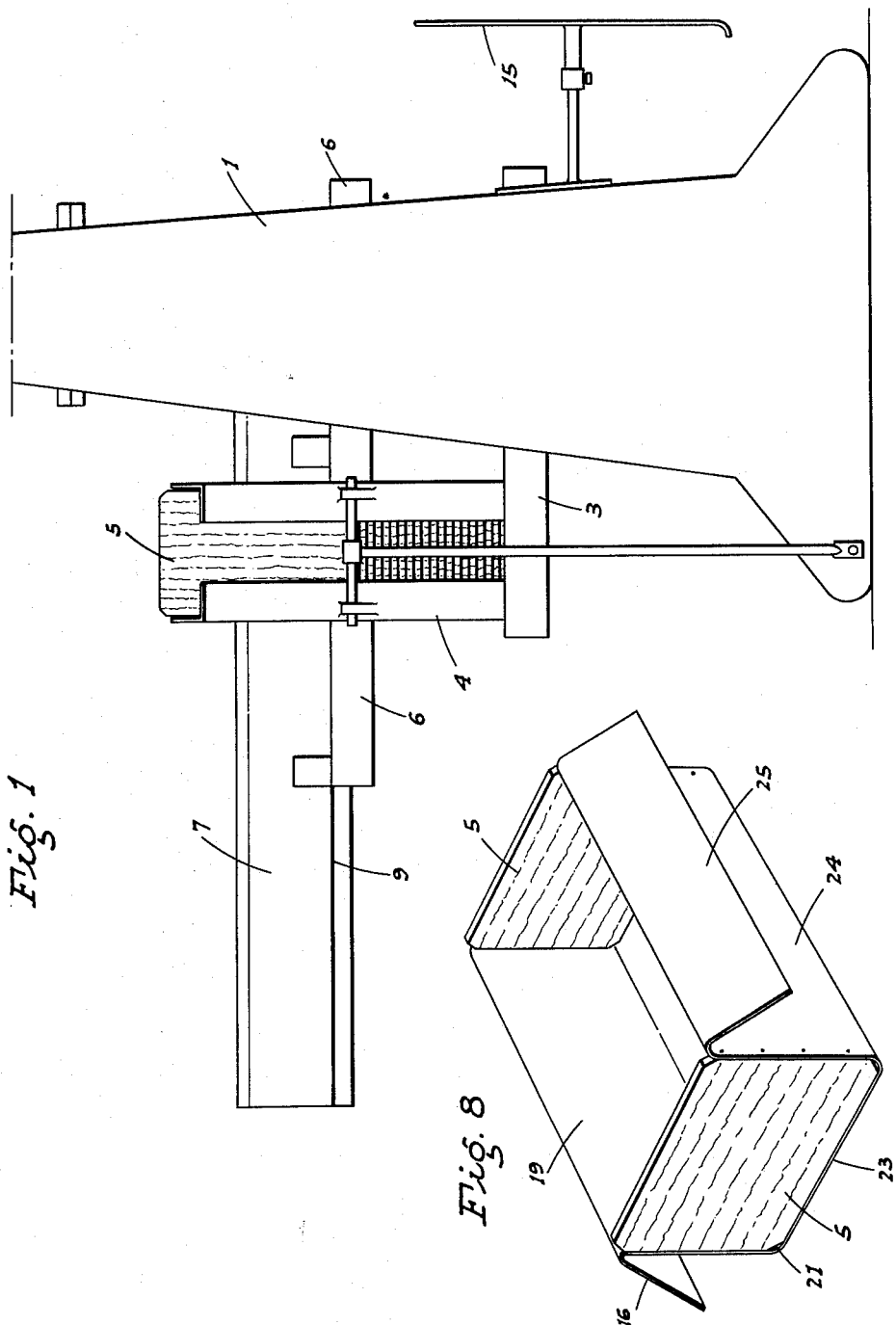
Fig. 1 is a side outline of the complete box-part assembling and nailing machine, showing particularly the hopper arrangement for the initially separate parts of the boxes to be assembled and nailed.

Referring now more particularly to the drawings, and to the characters of reference marked thereon, the numeral 1 denotes the main open-ended frame of a box-part assembling and nailing machine, the main construction and operational features of which are the same as those of my United States Patent No. 2,649,582. The present invention is applied to such machine without having to make any changes in the general construction and operation thereof.

Included with the machine are opposed vertical post units 2 disposed within the frame 1 in transversely spaced relation, and horizontal longitudinal anvils 3 are secured on the posts and project some distance from the rear end of the machine.

Chute-like hoppers 4 for a stack of box ends 5 in vertical on-edge relation are mounted on the anvils at the rear of the machine and project upwardly in an outward incline from said anvils; there being means cooperating with the hoppers 4 to feed said box ends 5 one at a time onto the anvils. Means are also provided to advance said box ends simultaneously to a nailing position on said anvils between the post units. Since the above means are fully shown and described in the above identified patent, and are not changed in any way, it is deemed unnecessary to illustrate the same in this application.

Longitudinal rails 6, parallel to the anvils 3, are secured to the post units 2 and project rearwardly from the machine at a level some distance above that of said anvils and support a longitudinal hopper 7 for a supply of rectangular but elongated sheets 8 of relatively stiff material, such as laminated kraft paper and wood veneer. The width of these sheets, which initially lie flat, is the same as the distance between the outer faces of a pair of box ends 5 supported on the anvils 3 (which is the length of the box); while their length is approximately the same as the periphery of said box ends.

The hopper 7 extends lengthwise between the flaring chutes 4, and terminates at its forward end a short distance rearwardly of the nailing position of the box ends 5 within the machine, as shown in Figs. 2-5 inclusive. Said hopper includes bottom flanges 9 for the side support of the lowermost sheet 8, said flanges being on a level slightly above the top edge of box ends 5 seated on the anvils 3, as shown—for example—in Fig. 2.

It may here be noted that the stack of sheets 8 is held clear of the flanges 9, and the lowermost sheet of the stack is released when necessary, and in timed relation to the operation of the machine, by suitable means which form no part of this invention. This leaves said lowermost sheet, which rests on the flanges 9, free to be pulled forwardly without the drag or pressure of the stack thereon.

Extending lengthwise laterally inward of the rails 6 and of the box ends 5 which lie adjacent said rails, are spring fingers 10, which—at their forward ends—carry rollers 11. The rollers 11 are disposed adjacent but laterally inward of the fingers, as shown in Fig. 6, and so that they are adjacent but not ahead of the forward edges of the box ends 5 when fully advanced.

The rear end portion 12 of each finger slopes upwardly to a level above that of the box ends 5 but below flanges 9, and terminates in an outwardly projecting ear 13 which is secured on the adjacent rail 6 outside the same, as shown at 14 in Fig. 7. This arrangement allows the box ends 5 to advance between the fingers and rails without interference. The spring fingers are designed for downward yielding movement from a position such that the rollers 11 normally project above the box ends 5 somewhat, or to a level adjacent that of the hopper flanges 9.

Figure 2:
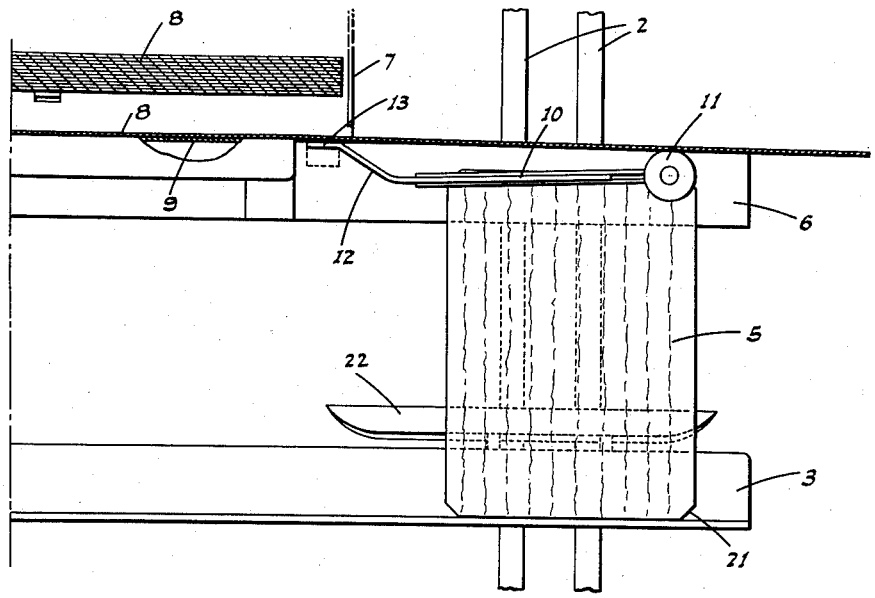
Fig. 2 is a fragmentary enlarged, and somewhat diagrammatic, sectional elevation showing a box end advanced to the initial nailing position, and in relation to one of the lifting units which are the main subject of this invention; the wrap-around sheet for the box being shown as initially advanced.

In operation, and assuming that the box ends 5 are wider than their height, as is common in certain produce boxes, a pair of such box ends 5 is advanced to nailing position with their greatest dimension vertically. The operator, standing at the front of the machine behind a protecting or limiting shield or plate 15 on the frame 1 (see Fig. 1), then reaches in and pulls forwardly on the sheet 8—which rests on flanges 9—until said sheet has been advanced half the width of the box ends 5 beyond the forward edges thereof, as shown in Fig. 2. This is to leave a flap 16 for subsequent closing over a portion of the top of the box. The portion of the sheet which overlies the upper edge of the box ends 5 is then clear of the same, and rests on the relatively raised rollers 11, as shown.

Figure 3:
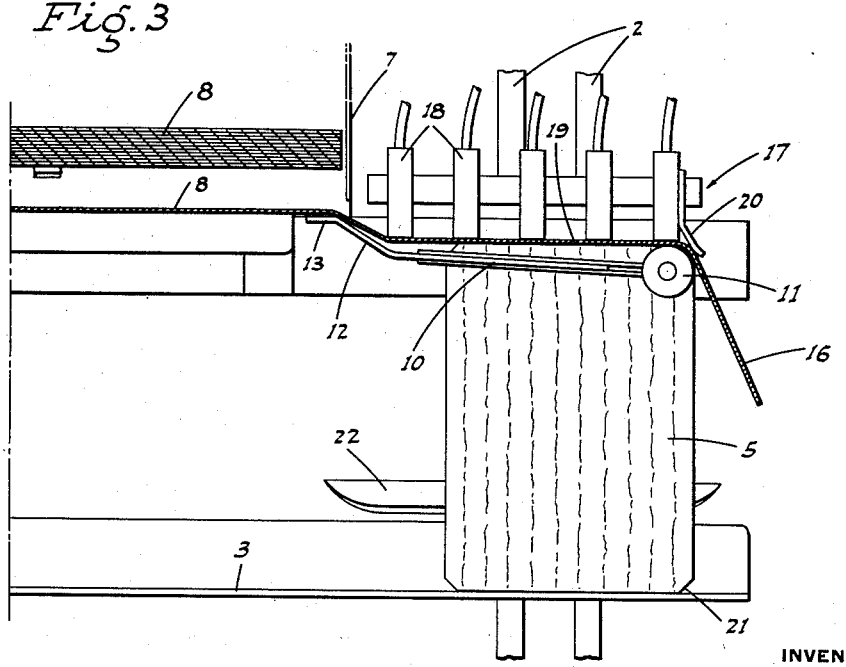
Fig. 3 is a similar view, but shows the related nailing unit as lowered and as effecting an initial nailing operation.

Thereafter, when the nailing units 17 of the machine drive downward, the chucks 18 of such units engage and depress the portion 19 of sheet 8 with which said chucks come in contact (and which forms one side of the box), and also depresses the rollers 11; the latter then lying in the upper forward corner of box ends 5, as shown in Fig. 3.

A deflecting finger 20 is mounted on the foremost chuck 18 of each of the transversely spaced rows thereof in position to engage and bend the flap 16 about the adjacent corner of the box ends 5. The box ends 5 are bevel-cut at the corners, as shown at 21, if a curving rather than a sharp bend of the sheet 8 is desired; the rollers 11 then forming—in effect—templates or anvils for the curving or bending action.

Upon the upward or return stroke of the nailing units 17, with retraction of the chucks 18, the spring fingers 10 are released from the hold-down pressure of said chucks, and then act to lift the box ends 5, and the box-side forming portion 19 of sheet 8 attached thereto, so that said box ends are hung in suspended relation practically free of the anvils 3, as shown in Fig. 4.

This lifting and suspending of the partly assembled box makes it an easy matter for the operator to manually pull the same forwardly at the top somewhat—the secured side 19 of the box riding on the rollers 11—and to then rock the box forwardly and downwardly about the rollers 11 as an axis, while at the same time further advancing the wrap-around sheet 8 from the hopper 7, until the longitudinal edges of the box ends 5, and which define the bottom of the box, are facing upwardly.

The lower longitudinal edges of the box ends then rest on the upper anvils 22 with which the nailing machine is equipped, as in said Patent No. 2,649,582, and which anvils 22 automatically fall into place as soon as the box ends 5 are lifted clear of the same, as shown in Fig. 5, and which restore the box ends to their original level. Of course, if the box ends 5 are square, the upper anvils 22 are unnecessary and are omitted.

In either case the bottom 23 of the box being assembled is thus disposed in position for nailing, and the nailing units 17 then drive downward to effect the nailing operation, as before, and as shown in Fig. 5.

The above operations are repeated until the final side 24 of the box is nailed in place, and the other free top flap 25 remains as the trailing end of the sheet 8. The box is thus completed, as shown in Fig. 8, and is withdrawn from the machine by the operator.

In actual practice each sheet 8, while stiff per se, is scored or otherwise weakened transversely where such sheet is to pass or bend about the corners of the box. The extent, longitudinally of the sheet, of such transverse scoring or weakening, is sufficient to compensate for any slight variation in the dimensions of the box ends from corner to corner. Further, the rollers 11 serve not only the purpose hereinbefore described, but also as a gauge by means of which the operator can locate the approximate center, longitudinally, of the initial or lead scoring or weakening of each sheet 8 with the starting corner of the box ends, and so that the following transverse scorings or weakenings will be properly oriented to the related corners of said box ends.

This gauging or locating action is obtained because the rollers 11, which are stationary as far as movement lengthwise of the machine is concerned, are disposed in substantially vertical alinement with said starting or leading corners of the box ends, and are initially some distance above said corners. Therefore, the operator, pulling the sheet 8 forwardly over the rollers 11 in contact therewith, can easily tell by the resistance offered by the relatively small roller area to downward movement of the sheet at that point, when the weakened zone of the sheet is over the rollers, and hence over the leading corner of the box ends. A reasonably accurate gauge as to the position of the weakened zone of the sheet relative to the leading corner of the box ends is thus obtained, even though the rollers are below the sheet and are thus not visible to the operator.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a machine for assembling and nailing a box which comprises rigid box ends and a single, wrap-around sheet of relatively stiff material forming the sides and bottom of the box; said machine including vertically movable nailing units, anvils below the nailing units to support a pair of box ends in transversely spaced facing relation and on edge in a predetermined horizontal position relative to the nailing units, substantially horizontal supporting means for the sheet located in a plane above the level of the top of anvil-supported box ends and rearwardly thereof whereby the sheet may be advanced from said supporting means to an initial portion overlying the upper edges of the positioned box ends for nailing thereto, and means mounted on the machine engaging the nailed portion of the sheet from underneath and, after retraction of the nailing units, lifting said sheet and the box ends so that the latter clear the anvils to facilitate manual turning of said box ends to dispose other edges thereof in upwardly facing relation and so that another portion of the sheet will be drawn from its supporting means for engagement over said other edges of the box ends.

2. A structure, as in claim 1, in which said means comprises transversely spaced spring fingers extending lengthwise of the direction of movement of the sheet from its supporting means, said fingers being mounted at their rear end rearwardly of the box ends at a level below that of said supporting means and above the level of the upper edges of said box ends, the forward ends of the fingers tending to move upwardly and said fingers being disposed laterally inward from the box ends, and elements mounted on the forward ends of the fingers to engage the sheet adjacent the forward edge of the box ends.

3. A structure, as in claim 2, in which said elements comprise transverse-axis rollers disposed in the plane of the forward upper corners of the box ends.

4. A structure, as in claim 1, in which said means comprises transversely spaced spring fingers extending lengthwise of the direction of movement of the sheet from its supporting means and disposed in transverse planes adjacent but laterally inward from the box ends, the forward ends of the fingers tending to spring upwardly, rollers carried by said ends of the fingers to engage the sheet adjacent the forward edges of the box ends, ears rigid with and projecting laterally out from the rear end of the fingers rearwardly of the anvil supported box ends at a level below the sheet supporting means but above the top of said box ends, and means securing the outer end of the ears on the machine.

5. In a box-part assembling and nailing machine, transversely spaced anvils adapted to support box ends on edge and in facing relation, there being a flat box part spanning between and overlying the box ends for nailing thereto, nailing units initially above the anvil-supported box ends adapted upon a down stroke to nail said flat box part to the box ends, a following up-stroke of the nailing units raising the same clear of the box ends and the flat box part then nailed thereto, and means operative upon such up-stroke of the nailing units to lift the box ends from said anvils.

6. In a box-part assembling and nailing machine, transversely spaced anvils adapted to support box ends on edge and in facing relation, there being a flat box part spanning between and overlying the box ends for nailing thereto, nailing units initially above the anvil-supported box ends adapted upon a down stroke to nail said flat box part to the box ends, a following up-stroke of the nailing units raising the same clear of the box ends and the flat box part then nailed thereto, and means operative upon such up-stroke of the nailing units to lift the box ends from said anvils; said means being downwardly yieldable but upwardly urged, and engaging the flat box part on the under side.

7. A structure, as in claim 6, in which said means includes elements which engage the under side of the flat box part adjacent corresponding upper corners of said box ends.

8. In a box part assembling and nailing machine, transversely spaced anvils adapted to support box ends on edge and in facing relation, there being a flat box part spanning between and overlying the box ends for nailing thereto, nailing units initially above the anvil-supported box ends adapted upon a down stroke to nail said flat box part to the box ends, a following up-stroke of the nailing units raising the same clear of the box ends and the flat box part then nailed thereto, and means, including spring fingers mounted in connection with the machine and disposed laterally inwardly of the box ends, operative upon such up-stroke of the nailing units to lift the box ends from said anvils.

9. A structure, as in claim 8, in which said means includes elements on the spring fingers engaging the flat box part on the under side.

10. A structure, as in claim 9, in which the the spring fingers are substantially parallel with the box ends and extend to a free end adjacent corresponding upper corners thereof, and said elements being transverse axis rollers on the free ends of the spring fingers; said fingers tending to raise the top of the rollers to a point above the level of the upper edges of the box ends when anvil supported.

11. In a box-part assembling and nailing machine, transversely spaced anvils adapted to support box ends on edge and in facing relation, there being a flat box part spanning between and overlying the box ends for nailing thereto, said flat box part being of bendable sheet material and inclining a flap projecting beyond corresponding upper corners of the box ends, nailing units initially above the anvil-supported box ends adapted upon a down stroke to nail said flat box part to the box ends, and an element on each nailing unit operative upon said down stroke to engage the flap and bend the same downwardly about said corners of the box ends.

12. In a machine for assembling and nailing a box which comprises rigid box ends and a single wrap-around sheet of relatively stiff material forming the sides and bottom of the box and weakened transversely at the corners of the box, said machine including anvils to support box ends on end and in facing relation in position for nailing, supporting means for the sheet located rearwardly of the anvils whereby such sheet may be advanced from said supporting means to an initial position overlying the upper edges of the positioned box ends for nailing thereto, and means on the machine to form a gauge for locating one transverse weakening of the sheet in position at an upper corner of the box ends as the sheet is advanced from the supporting means.

13. A structure, as in claim 12, in which said last named means comprises small-diameter rollers mounted in transverse alinement with the upper forward corners of the anvil-supported box ends in position for engagement by the sheet when the latter overlies said upper edges of the box ends.

References Cited in the file of this patent

UNITED STATES PATENTS

| | | |
|---|---|---|
| 914,820 | Gentle | Mar. 9, 1909 |
| 2,649,582 | Paxton | Aug. 25, 1953 |